UNITED STATES PATENT OFFICE.

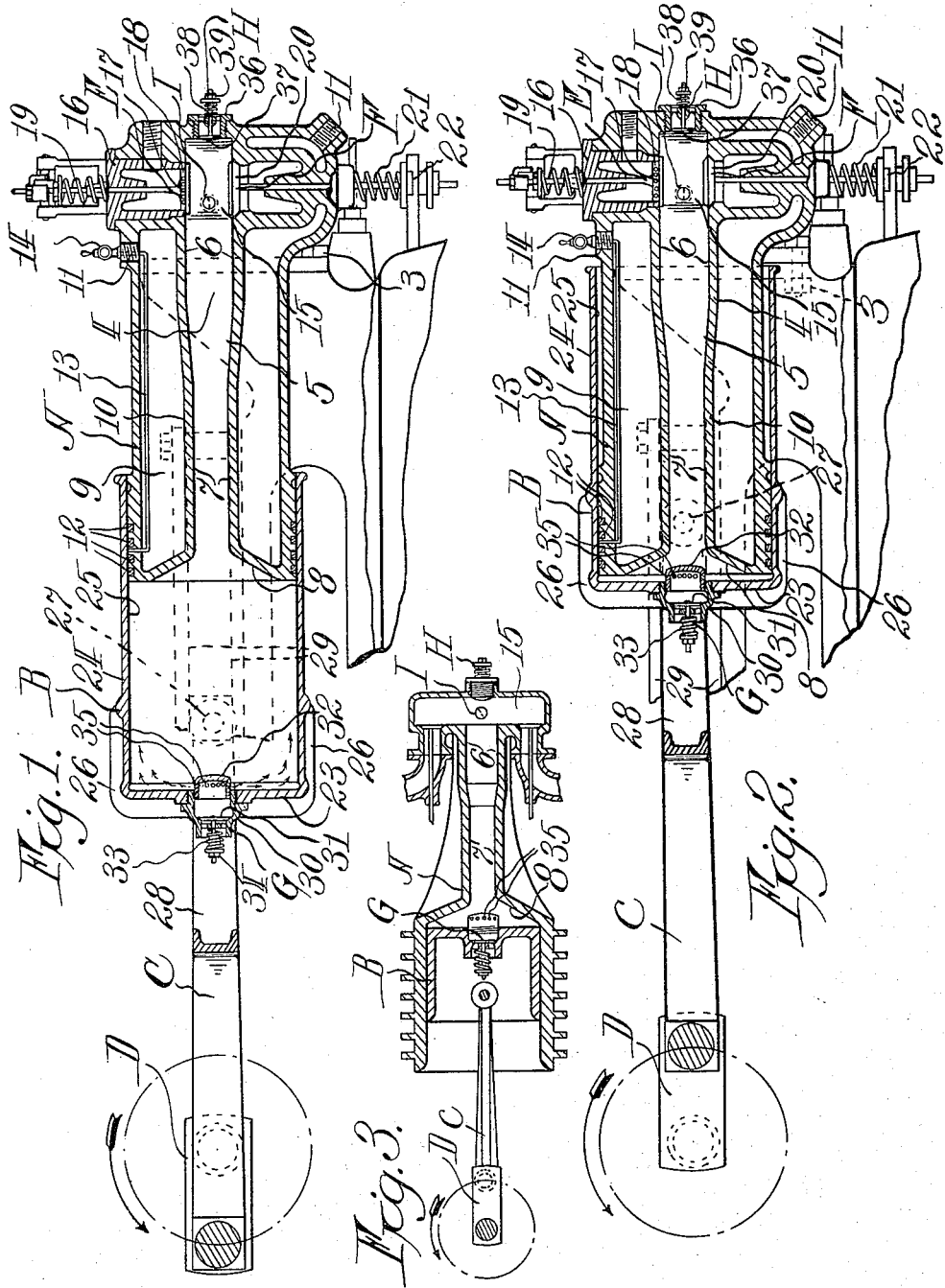

WILLIAM A. SORG, OF MINNEAPOLIS, MINNESOTA, ASSIGNOR, BY MESNE ASSIGNMENTS, TO FREDERICK G. BRADBURY, TRUSTEE, OF ST. PAUL, MINNESOTA.

COMBUSTION-ENGINE.

1,147,455. Specification of Letters Patent. Patented July 20, 1915.

Application filed March 18, 1912. Serial No. 684,485.

*To all whom it may concern:*

Be it known that I, WILLIAM A. SORG, a citizen of the United States, residing at Minneapolis, in the county of Hennepin and State of Minnesota, have invented a new and useful Improvement in Combustion-Engines, of which the following is a specification.

My invention relates to improvements in internal combustion engines and among its objects is to provide a reciprocating combustion engine in which the fuel, spent gases and air in a combustion chamber at the moment of explosion are separated into independent strata for purposes of fuel economy and power efficiency.

Another object is the complete vaporizing of heavy fuel oils without previously heating the oil or air taken into the combustion chamber and without the use of water as a spray to cool the interior of said chamber.

Further objects of my invention will be apparent from the following description and to these ends my invention consists of the features of construction and combination of parts which are hereinafter described and particularly pointed out in the claims.

In the drawings with which I have illustrated my invention and which form part of this specification, Figure 1 is a longitudinal section of the elements of my engine, the parts being illustrated at the end of the charging stroke of the piston; Fig. 2 is a similar view taken at the end of the compression stroke and Fig. 3 is a view of an alternative construction of my device in section using the same principles of operation.

In the above drawings I have illustrated an engine, having a cylinder A containing the explosion or charging chamber, a reciprocating piston B formed to reciprocate outside of the cylinder A, a connecting rod C attached to the piston B and a crank D. The cylinder A is provided with an intake valve E and an exhaust valve F, each of which may be mechanically or automatically operated in the usual manner, and the piston B is provided with an air inlet G positioned on the axis of the cylinder A. At the closed or intake end of the charging chamber is an air inlet valve H.

The cylinder A is shown mounted upon an engine bed 2 with which it may be formed integral or connected by bolts 3 in any suitable manner. The combustion or charging chamber 4 is formed on the axis of the cylinder A and extends longitudinally on the cylinder. It tapers at 5 for a short distance forming cylindrical ends 6 and 7, the latter being of less diameter than the former and located in the crank end of the cylinder. The piston extremity of the combustion chamber flares sharply outward at 8 thus forming a trumpet shaped extremity at the crank end of the cylinder. A water jacket 9 is provided adjacent the wall 10 of the combustion chamber through which water ports 11 lead from any suitable source of supply.

The cylinder A is provided near its crank end with external packing means 12 and a lubricating duct 13 to which lubricant may be supplied in any suitable manner such as by means of the lubricating cup 14. The piston B reciprocates on the outside of the cylinder with its inner face in contact with the packing rings and lubricant on the cylinder.

The inlet and exhaust valves E and F are connected with the combustion chamber near its throat end, opening directly into a charging chamber 15 which is an elongation of the combustion chamber and carries the spark plug I in its wall. The mixture inlet E is formed with a valve cage 16 fitting the cylinder A and a valve 17 having a ring 18 operating in a seat in the cage and perforated horizontally so as to spray the mixture in the charging chamber 15. A compression spring 19 is mounted on the cage 16 to maintain the valve 17 normally in closed position. The operation of the inlet E is by suitable mechanism not shown or may be automatic to permit the entrance of fuel into the charging chamber.

The exhaust F has a valve 20 seated in the wall of the cylinder and has a spring 21 normally holding it in closed position. A valve operating mechanism 22 is connected with the valve 20 and may be connected with the crank D of the engine in any suitable manner not fully shown to operate the exhaust F at desired intervals with relation to the power explosions in the combustion chamber. The spring 21 is sufficiently strong to prevent the opening of the valve by the suction of the charging stroke of piston B.

The piston B has the form of a hollow cylinder with a head 23 and an integral side wall 24, the inner face 25 of which operates in contact with the cylinder A. A series of flanges 26 is provided extending across the head 23 and for a portion of the length of said wall 25 for combining lightness and strength to the head and for the radiation of excessive heat from the structure of the piston during the operation of the engine.

The piston B is connected with the connecting rod C such as by means of gudgeons 27 on the sides of the piston on which are journaled the bifurcations 28 of the connecting rod C. The gudgeons 27 also provide a sliding support for the piston B reciprocating in the slideway formed by the slide bars 29 of the engine bed.

The air inlet G consists of a valve cage 30 threaded in the head 23 of the piston B on the axis of the piston and cylinder provided with an inlet valve 31 operable to admit air through a sprayer 32 which is threaded into the inner end of the valve cage 30, during the charging stroke of the piston. A compression spring 33 mounted on the stem of the valve 31 serves to hold the valve normally closed said spring being adjustable by means of a nut 34 threaded on the stem of the valve. The function of the valve is to admit air from the outer atmosphere to the interior of the piston and to spray said air back upon the inner wall of the head end of the piston and along the surface 25 toward the cylinder, the perforations 35 being grouped in a circle in the sprayer and inclined backwardly toward the head end of the piston. The operation of the air inlet valve G may be automatic as illustrated or may be mechanically operated by suitable mechanism not shown if desired. The valve H also admits air automatically during the intake stroke of the piston and is also formed with a valve cage 36 threaded into the rear end wall of the combustion chamber and provided with a valve 37 which is seated and held normally closed by means of the spring 38 which is adjustable by means of the nut 39 on the valve stem. This valve admits air into the tubular combustion chamber and the combustion chamber being of even diameter for a distance near its piston end causes the air so admitted to form in a column. The column of air thus formed is projected in parallel lines co-axially with said chamber and impinges against and spreads over the inner surface of the head end of the reciprocable member. This spreading action of the air in a layer or stratum over the inner surface of the inner end and side wall of the reciprocable member cools the surface with which the air comes into contact. This air which is projected from the combustion chamber co-acts with the layer of air admitted through the air inlet G to increase the cooling effect.

In operation presuming that the engine has fired a charge and that the piston is in the position shown in Fig. 2 and the intake stroke is about to take place, the piston moves forwardly into the position illustrated in Fig. 1 and the valves G and H are opened automatically and admit air into the combustion chamber. A charge of air is sprayed by the valve G upon the cylinder wall in the required direction compensating for the movement of the reciprocating piston. The effect of this cold air striking the cylinder walls is to cool the walls and to prevent the burning of the oil on the inner surface of the piston walls. The air admitted by the valve H at the opposite end of the combustion chamber is projected forward through the charging chamber and carries with it in a quick and effective manner all the dead gas contained in the combustion chamber as well as a certain quantity of air. The quantity of air admitted through valve H is determined by the size of the valve. The fuel intake is made to operate automatically or by mechanical means of ordinary construction at quarter stroke or at any desired time. The air and products of combustion having been carried forward out of the combustion tube impinge upon the piston (or flatten out on the piston head) forming a layer of combined air and dead gas. The fuel intake then opens and the charge of fuel mixture is carried through the tube and fills up the balance of the space. On the return stroke these gases formed in strata retain their relative position and are substantially all compressed into the tube, the fuel charge remaining in the combustion tube and the dead gas and air being arranged adjacent the piston B. When ignition takes place (at ignition point) which is about the relative position indicated in Fig. 2, the entire charge of flame and gas is projected into air in the center of the piston and the flame or heat is generated from the center, outward. In this way sufficient air is supplied to complete combustion and at the same time the walls of the cylinder are protected from extreme heat. The return stroke of the piston from the position illustrated in Fig. 1 to the position shown in Fig. 2 expels most of the spent gases, the exhaust valve F being opened automatically at the start and closed at the finish.

In the alternative construction illustrated in Fig. 3 the same primary elements are employed as in the preferred construction, the piston however is made to reciprocate inside instead of outside of the cylinder and the various modifications illustrated will be apparent to any one skilled in the art to which this invention relates after a full understanding of the preferred construction is had.

It will be noted that my invention supplies a separate stratum of air which being kept in the tube out of contact with fuel until after ignition permits of complete combustion at all engine speeds and under all conditions. It will also be noted that by means of my improved combustion tube, all the heavier portions of oil or other fuel deposited on the inside walls of the combustion chamber are vaporized by the time the compression is completed, that lubricating oil reaches the hottest part of the piston and lubricates it at its closed or inner end and that the walls of the piston are effectively cooled and protected by the influx of cold air. The air valve in the cylinder or directly opposite the valve in the piston assists in scavenging or removing the dead gas out of the combustion or vaporizing chamber and assists in localizing it on the inner end of the piston, thereby forming it into a stratum separate from the fuel mixture itself. The fuel intake valve with its perforations acts as an atomizer bringing all of the oil fuel into the vaporizing chamber in the form of a fine mist or fog. The shape of the combustion chamber is designed so that shortly after ignition the entire contents of the vaporizing chamber are projected forward into the space uncovered by the reciprocating piston in the center of a core of air. The entire results of this construction is great efficiency both in the kerosene, gasolene or other hydro-carbon fluids because sufficient air is always supplied to produce complete combustion. Greater efficiency is also produced because the fuel is all vaporized and because the average temperature is decreased thereby preventing surface loss of heat. Greater reliability is also produced because the dead gases are entirely removed from the point of ignition and a fresh fuel mixture is always located at the ignition point. Greater economy is attained because the compression of the mixture charge immediately after its ignition at the head end of the combustion chamber takes place is automatically raised by the expansion of gases which are fired close around the ignition point. Further greater economy is also attained because the larger part of the fuel charge is consumed after the piston has moved one third or one half stroke causing the greater part of the heat to remain in contact with the walls of the piston a shorter time than with the ordinary engine.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claim.

Having described my invention, what I claim as new and desire to protect by Letters Patent is:—

An engine of the class set forth, comprising, in combination, a piston having end and side walls, a cylinder with which said piston is in reciprocable connection having a tube extending beyond the stroke of and being less in diameter than the diameter of said piston, an oil inlet adapted to apply a lubricant between the working surfaces of said piston and cylinder, fuel inlet and exhaust valves near the outer end of said tube, an air inlet in said piston substantially on the axis thereof having a valve with laterally projecting openings adapted to admit air back upon the end wall of said piston and outwardly against the inner surface of the contiguous side wall whereby the surfaces against which said air impinges are cooled and means near one end of said tube for igniting the mixture charge, said piston being adapted to compress substantially all of the fuel air and inert gas in said tube previous to ignition.

In testimony whereof, I have signed my name to this specification, in the presence of two subscribing witnesses.

WILLIAM A. SORG.

Witnesses:
 FLORENCE T. SORG,
 G. M. DUBACH.

Copies of this patent may be obtained for five cents each, by addressing the "Commissioner of Patents, Washington, D. C."